(12) United States Patent  
Smith et al.

(10) Patent No.: US 10,810,394 B2  
(45) Date of Patent: Oct. 20, 2020

(54) AUTHENTICATION OF A CONTAINER AND/OR PRODUCT PACKAGED THEREIN

(71) Applicant: Owens-Brockway Glass Container Inc., Perrysburg, OH (US)

(72) Inventors: Roger P. Smith, Perrysburg, OH (US); Jessica R. Bryant, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 90 days.

(21) Appl. No.: 16/294,602

(22) Filed: Mar. 6, 2019

(65) Prior Publication Data

US 2020/0285825 A1 Sep. 10, 2020

(51) Int. Cl.
*G06F 17/00* (2019.01)
*G06K 7/14* (2006.01)
*G06K 19/06* (2006.01)

(52) U.S. Cl.
CPC ......... *G06K 7/1491* (2013.01); *G06K 7/1417* (2013.01); *G06K 7/1434* (2013.01); *G06K 19/06093* (2013.01)

(58) Field of Classification Search
CPC .......... G06Q 30/0185; G06Q 20/3674; G06Q 10/087; G06K 7/1404; G06K 19/06037; G06K 19/086; G06K 7/12; G06K 9/00288; G06K 9/00577; G06K 7/1413; G06K 9/18; G06K 9/00442; G06K 9/00483; G06K 7/1491; G06K 7/1417; G06K 19/06093; G06K 7/1434

USPC ................................................ 235/375, 380
See application file for complete search history.

(56) References Cited

U.S. PATENT DOCUMENTS

| | | |
|---|---|---|
| 4,603,785 A | 8/1986 | Gach |
| 6,254,139 B1 | 7/2001 | Fresnel |
| 7,055,746 B2 | 6/2006 | MacKay et al. |
| 7,566,004 B2 | 7/2009 | He et al. |
| 8,714,442 B2 | 5/2014 | Sharma et al. |
| 8,905,313 B2 | 12/2014 | Rapoport et al. |
| 9,378,445 B2 | 6/2016 | Istuck et al. |
| 9,536,404 B2 | 1/2017 | Glamuzina, Jr. et al. |
| 2006/0139173 A1 | 6/2006 | Fang et al. |
| 2008/0197969 A1 | 8/2008 | Vogt et al. |
| 2009/0218391 A1* | 9/2009 | He ................. G06Q 10/06 235/375 |
| 2010/0250457 A1* | 9/2010 | Seitz ................. B42D 25/29 705/318 |

(Continued)

FOREIGN PATENT DOCUMENTS

| | | |
|---|---|---|
| FR | 2667576 A1 | 4/1992 |
| FR | 2943041 A1 | 9/2010 |
| WO | WO03038767 A1 | 5/2003 |

*Primary Examiner* — Jamara A Franklin

(57) ABSTRACT

A system and method for use in authenticating one or both of a container and a product packaged therein. The method comprises obtaining images of each of two codes carried by a container system comprising the container. The method further comprises determining, for each image, a contrast ratio between one or more elements of the code in the image and the background of the code. The method still further comprises determining the authenticity of one or both of the container and the product packaged therein based at least in part on the contrast ratios for each image, and therefore, each code.

20 Claims, 3 Drawing Sheets

(56) References Cited

U.S. PATENT DOCUMENTS

| | | |
|---|---|---|
| 2013/0169409 A1* | 7/2013 | Chang ................ G06Q 30/0185 |
| | | 340/5.8 |
| 2014/0095398 A1 | 4/2014 | Lin |
| 2014/0116911 A1 | 5/2014 | Bryant |
| 2015/0235233 A1 | 8/2015 | Dangmann et al. |
| 2016/0027021 A1 | 1/2016 | Kerdemelidis |
| 2016/0340082 A1 | 11/2016 | Bryant et al. |
| 2017/0032382 A1 | 2/2017 | Shulman et al. |
| 2017/0061350 A1 | 3/2017 | Smith et al. |
| 2017/0109549 A1 | 4/2017 | Fradet et al. |
| 2017/0340518 A1 | 11/2017 | Logunov et al. |

* cited by examiner

US 10,810,394 B2

AUTHENTICATION OF A CONTAINER AND/OR PRODUCT PACKAGED THEREIN

The present disclosure is directed to authentication of goods and, more particularly, to systems and methods for use in authenticating a container and/or a product packaged therein.

BACKGROUND

Containers, such as glass containers, can be filled with a product and transported to another location. During transportation, the containers can be authenticated and tracked to ensure proper delivery and to avoid counterfeiting activities. After delivery, the product in the containers can be consumed.

BRIEF SUMMARY OF THE DISCLOSURE

The present disclosure embodies a number of aspects that can be implemented separately from or in combination with each other.

In accordance with one aspect of the disclosure, a method for use in authenticating one or both of a container and a product packaged therein is provided that includes obtaining an image of a first code carried by a container system comprising the container, wherein the first code has one or more elements and is representative of first information relating to one of the container and the product packaged in the container and determining a first contrast ratio between the one or more elements of the first code and a background of the first code. Additionally, the method includes obtaining an image of a second code carried by the container system, wherein the second code has one or more elements and is representative of second information relating to the other of the container and the product packaged in the container, and determining a second contrast ratio between the one or more elements of the second code and a background of the second code. The method further comprises determining a difference between the first and second contrast ratios and determining authenticity of one or both of the container and the product packaged therein based at least in part on the difference between the first and second contrast ratios.

In accordance with another aspect of the disclosure, a method for use in authenticating one or both of a container and a product packaged therein is provided that includes obtaining an image of a first code carried by a container system comprising the container, wherein the first code has one or more elements and is representative of first information relating to one of the container and the product packaged in the container and determining a first contrast ratio between the one or more elements of the first code and a background of the first code. Additionally, the method comprises obtaining an image of a second code carried by the container system, wherein the second code has one or more elements and is representative of second information relating to the other of the container and the product packaged in the container and determining a second contrast ratio between the one or more elements of the second code and a background of the second code. The method further comprises determining authenticity of one or both of the container and the product packaged therein based at least in part on the first and second contrast ratios.

In accordance with yet another aspect of the disclosure, there is provided a system comprising: a central server; a database accessible by the server and providing storage for data relating to one or both of a container and a product packaged in the container traveling within a distribution chain; and at least one electronic code reader configured to capture images of codes carried by a container system that includes the container and to electronically communicate the captured images and/or encoded data associated with the captured images to the central server. In an embodiment, the central server is configured to: obtain an image captured by the code reader of a first code carried by the container system, wherein the first code has one or more elements and is representative of first information relating to one of the container and the product packaged in the container; determine a first contrast ratio between the one or more elements of the first code and a background of the first code; obtain an image captured by the code reader of a second code carried by the container system, wherein the second code has one or more elements and is representative of second information relating to the other of the container and the product packaged in the container; determine a second contrast ratio between the one or more elements of the second code and a background of the second code; and determine authenticity of one or both of the container and the product based at least in part on the first and second contrast ratios.

BRIEF DESCRIPTION OF THE DRAWING

The disclosure, together with additional objects, features, advantages and aspects thereof, will be best understood from the following description, the appended claims, and the accompanying drawings, in which:

DETAILED DESCRIPTION

A general object of the present disclosure, in accordance with at least one aspect of the disclosure, is to provide a system and method for authenticating one or both of a container and a product packaged in the container. The container may be part of a container system that also includes, among possibly other components, a closure and/or a seal. The container may include, for example, a permanent code carried thereby (e.g., etched into the outer surface of the container), and the closure or the seal may include, for example, a destructible code carried thereby that is configured to be destroyed when the container is opened. The permanent code and the destructible code can be linked together in a database and the linked pair may be used to determine the authenticity of the container and/or product packaged therein at various points in a supply chain.

Part of an authentication process for a container having a permanent code and a destructible code associated therewith and/or the product packaged in the container may comprise determining whether a code scanned from the container is, in fact, a permanent code embedded in the surface of the container and not a counterfeit code placed or applied onto a container, for example, over a permanent code.

Employing the system and method described herein eliminates or at least lessens the need for the container to be constantly tracked from the point of manufacture to the point of consumption in order to ensure authenticity. The authentication methodology described herein can be performed at any point in the supply chain to confirm the container has not been opened, and it can also be determined and verified that one of two scanned codes is, in act, a permanent code embedded in the container surface using, at least in part, a contrast ratio between the elements and the background in an image of the scanned code. The ability to determine that the code on the container is the original and permanent code ensures that the container is not reused and/or ensures that the product in the container is not a counterfeit product.

Figure 1A:
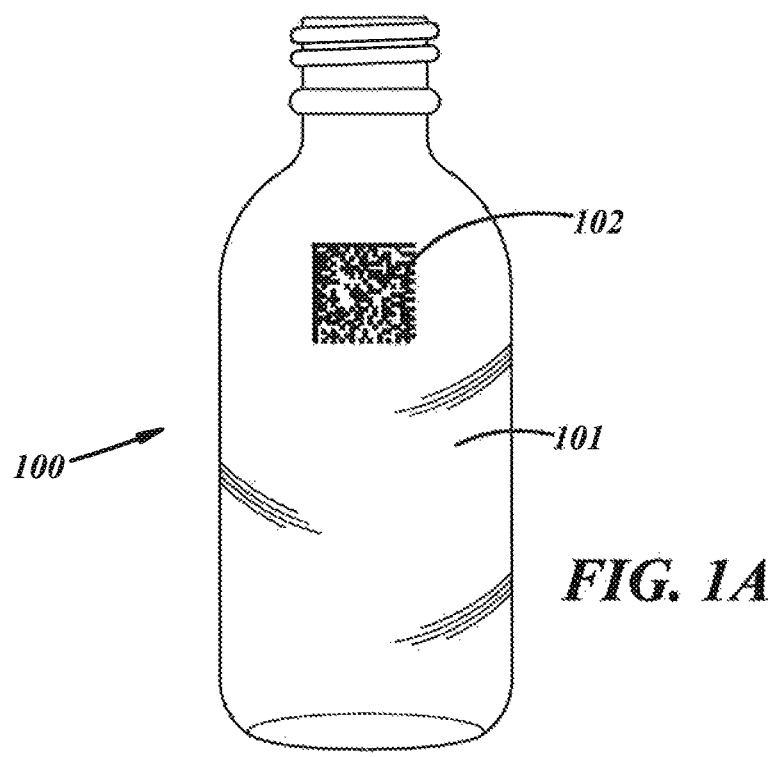
FIG. 1A is a diagrammatic view illustrating a container having a first code disposed thereon, in accordance with an illustrative embodiment of the present disclosure.
Figure 1B:
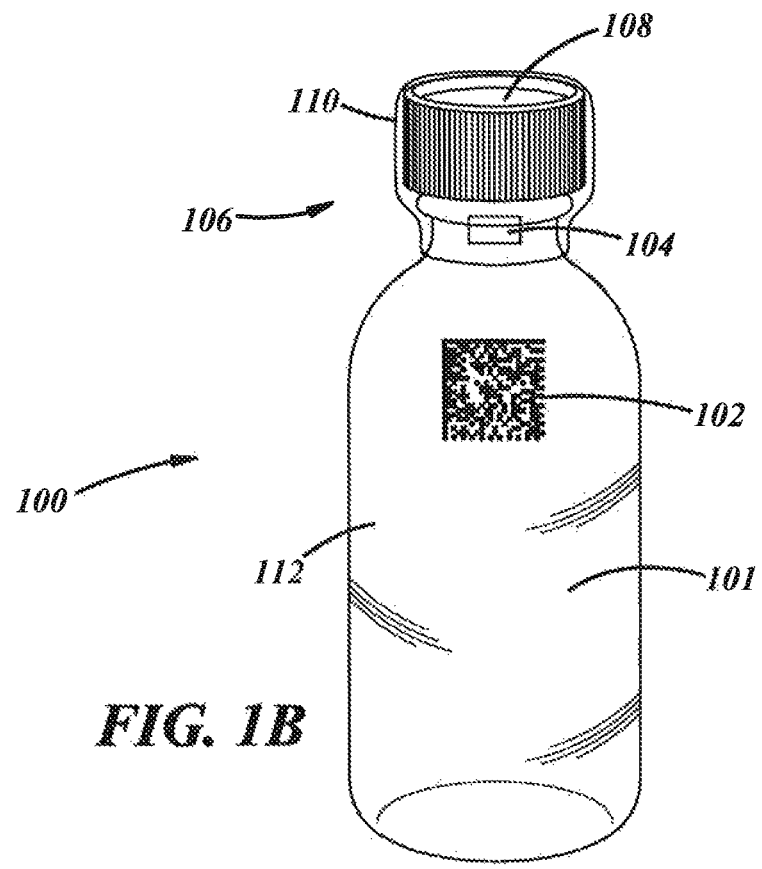
FIG. 1B is a diagrammatic view illustrating a container system including the container illustrated in FIG. 1A, a closure, and a seal having a second code disposed thereon.

FIGS. 1A and 1B depict diagrammatic illustrations of a container system 100 in accordance with an embodiment of the disclosure. In this embodiment, the container system 100 comprises a container 101 having a product 112 packaged therein, a first code 102 carried by the container 101, a container closure system 106, and a second code 104 carried by the container closure system 106. In an embodiment, the container closure system 106 comprises a closure 108 and a seal 110, and in such an embodiment, the second code 104 may be carried by the closure 108 and/or be carried by or comprise the seal 110.

In embodiments, the container 101 may include, for example, a bottle, a jar, a jug, a food or beverage container, or another suitable container in which a variety of goods or products may be packaged, including, for example and without limitation, various types of food products and other liquids, gels, powders, particles, and the like. The container 101 may be formed of glass, plastic, metal, or another suitable material for packaging goods/products, for example, those goods/products identified above. Additionally, the container 101 may be fabricated using a number of manufacturing processes depending on the material from which the container is formed. For example, if formed of glass, the container 101 may be fabricated using a press-and-blow, blow-and-blow, or hand blowing manufacturing process. If the container 101 is formed of plastic, it may be fabricated using an injection and/or blow molding operation. Accordingly, it will be appreciated that the present disclosure is not intended to be limited to containers of any particular material(s) and any particular manufacturing process(es). In a specific embodiment, however, the container 101 comprises a bottle formed of glass.

As illustrated in FIGS. 1A and 1B, the first code 102 may be disposed on or embedded in the container 101 and can be configured to be readable by an appropriately configured code reader (e.g., a smart phone, a tablet, a bar code scanner, and the like) or another device suitable to scan or image the first code 102. The first code 102 may be a visible, passive, and/or unique machine-readable code (e.g., smart phone-readable) that may be permanently disposed on, embedded in, and/or etched onto or into the container 101. For example, in an illustrative embodiment, the first code 102 may include a code laser-etched into a surface (e.g., outer surface) of the container 101. The first code 102 may include any identifying marking with one or more optically-readable elements or combination of elements (e.g., dots, letters, numbers, symbols, graphics, lines, or other indicia) arranged in a particular manner. Some examples of the first code 102 include a data matrix code, a bar code, and/or a quick response (QR) code. In a specific example, the first code 102 may include a bar code with a series of lines arranged in a predetermined pattern (e.g., differing line and space widths) that are etched into a surface of container 101. It is contemplated that the first code 102 may include other types of unique identification technology to supply an individualized machine-readable identifier, for example, an alphanumeric code. In any event, the first code 102 is representative of certain predetermined information relating to the container. This information may include, for example, a date of container manufacture, a time of container manufacture, production facility data, container quality data, and/or other information relating to the container.

As briefly described above, the container system 100 includes a container closure system 106, which may, in turn, include a closure 108 and, in at least some embodiments, a seal 110. The container closure system 106 is configured to contain the product 112 within container 101. In implementations, the closure 108 of the closure system 106 may include a cap, a lid, a cork, a plug, or any other suitable type of closure. Additionally, the closure 108 may be composed of plastic, metal, glass, rubber, cork, ceramic, or any other suitable material.

In the embodiment illustrated in FIG. 1B wherein the container closure system 106 includes a seal, the seal 110 may be coupled or affixed to and/or overlap at least a portion of each of the closure 108 and the container 101. The seal 110 may include any suitable material, for example, paper (e.g., a paper label), a tamper evident shrink band, foil, and the like and may be affixed, adhered, or attached to the closure 108 and/or the container 101 using known processes and/or techniques. In implementations, the seal 110 may be configured to be destructible such that it must be broken, destroyed, and/or altered when the closure 108 is opened.

In embodiments, the second code 104 carried by the container closure system 106 may be disposed on, printed on, and/or otherwise integrated into a portion of the seal 110, and can be configured to be readable by an appropriately configured code reader (e.g., a smart phone, a tablet, a bar code scanner, and the like) or another device suitable to scan or image the second code 104. The second code 104 may include any identifying marking with one or more optically-readable elements or combination of elements (e.g., dots, letters, numbers, symbols, graphics, lines, or other indicia) arranged in a particular manner. In implementations, the second code 104 may include a unique machine-readable code, for example, a bar code, a QR code, or the like, and may be representative of certain predetermined information relating to the product packaged in the container. This information may include, for example, a date on which the container was filled, information relating to the facility at which the container was filled, the type of product, a time at which the container was filled, and/or other information relating to the product 112. After the container 101 is filled with the product 112, the second code 104 may applied to the container 101 and closure 108 thereby sealing the container, or may be applied to the seal 110 that is or will be applied or affixed to the container 101 and closure 108.

Additionally, each of the first code 102 and the second code 104 may have a respective contrast ratio associated therewith. A contrast ratio may include the measurement of the luminance of the brightest color in each respective code (e.g., white) to that of the luminance of the darkest color in the same code (e.g., black). For example, a QR code may include a set of elements printed on a white background, where the elements include spaced black dots. The contrast ratio for the QR code can include the ratio of luminance of the white background to the luminance of the spaced black dots. It will be appreciated that the contrast ratio may include the luminance of other colors and/or other configurations. In another example, a bar code can include a set of lines etched on the surface of a glass container. In this example, the contrast ratio can include the ratio of luminance of the etched lines to that of the glass surface.

Each contrast ratio can be specific to the material and/or color of the material upon which the code is printed (e.g., glass, plastic, paper, foil, metal, and the like). For example, an initial code reading (e.g., before the container 101 is filled) can result in a first contrast ratio, and a second code reading (e.g., after the container 101 is filled) of the same initial code can result in a different second contrast ratio. In this example, each code disposed on the container 101 can be the same code for each reading, but each reading of the code can result in a different, distinct contrast ratio due to the effect of the color of the product or absence of product in the container 101. In another example, the first code 102 can be read before filling the container 101 with the product resulting in a first contrast ratio, and the first code 102 can be read after filling the container 101 with the product resulting in a second contrast ratio, where the first code 102 can be associated with both the first contrast ratio and the second contrast ratio. In this specific example, the second code 104 may only be read once after filling the container 101 resulting in only one contrast ratio associated with the second code 104. It will be appreciated that each code (e.g., the first code 102, the second code 104) may be read only once to obtain only one contrast ratio or multiple times to obtain multiple contrast ratios for each code. The second contrast ratio can be linked and/or associated with the first contrast ratio for the same code and stored in database 140.

Before filling and/or after filling and sealing of the container 101, the first code 102 and the second code 104 may be read by a code reader and associated with or linked together in a database of an authentication system that may be used for authenticating containers and/or products packaged therein at various points in a supply chain between from where the filled container is initially shipped to a final destination with an end user. Reading the first code 102 and/or the second code 104 may include reading each code both before and after filling the container to obtain the first contrast ratio and the second contrast ratio for each respective code.

As will be described in greater detail below, when an individual (e.g., consumer or end-user, personnel at a distribution center, etc.) wishes to authenticate the container 101 and/or the product 112 in the container 101, a code reader can be used to read one code (e.g., the first code 102 or the second code 104). The individual may then be prompted to read another code with the code reader (e.g., the other of the first code 102 and the second code 104). In some implementations, the code reader may be used to read both codes without being prompted to do so. In any event, in an embodiment, once the two codes are read (e.g., images of the codes are captured by the code reader), the code reader can then check a database for proper linkage of the first code 102 and the second code 104, meaning that the codes and/or contrast ratios thereof are the same as originally scanned and linked together in the database subsequent to filling of the container. If proper linkage exists, the user would be notified that the container 101 and/or product 112 is authentic. If the linkage is not proper, the user would be notified that the container 101 and/or product 112 may be counterfeit.

Figure 2:
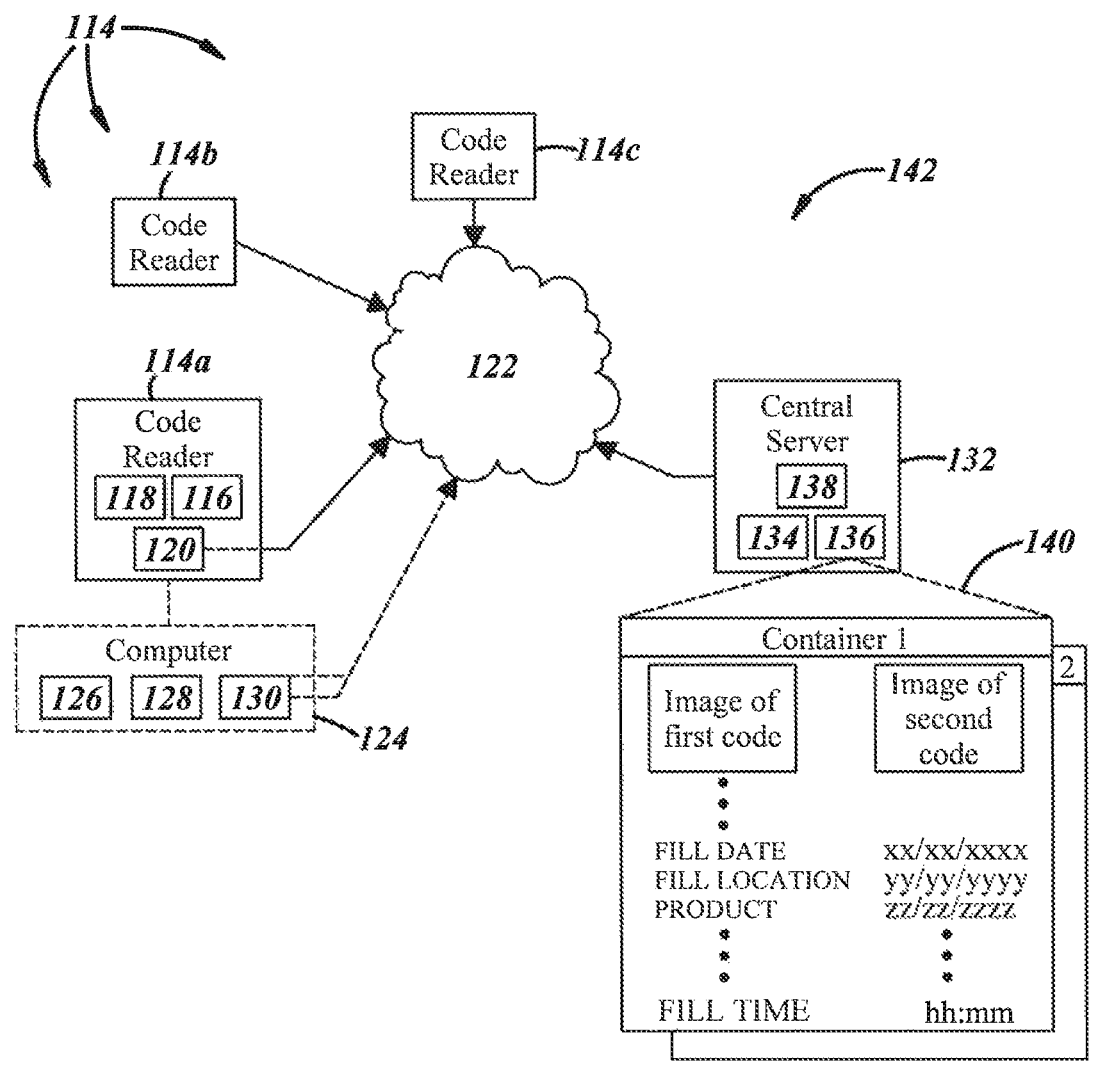
FIG. 2 is a perspective view of an illustrative embodiment of an operating environment comprising a system for use in authenticating a container and/or a product packaged therein, in accordance with an illustrative embodiment of the present disclosure.

FIG. 2 depicts an operating environment that comprises an authentication system 142 that may be used to implement the method disclosed herein. The authentication system 142 generally includes a central server 132, one or more electronic code readers 114 (e.g., code readers 114a, 114b, 114c, etc.) each electrically connected to (e.g., wireless or over a wired network) and configured for communication with the central server 132 and each configured to read machine-readable codes, and database or data repository 140 that is part of or accessible by the server 132. It should be understood that the disclosed method can be used with any number of different systems and is not specifically limited to the operating environment shown in FIG. 2. The following paragraphs provide a brief overview of one illustrative embodiment of the authentication system 142; however, other systems not shown here could employ or perform the disclosed method as well.

The central server 132 may be used to control, govern, and/or manage certain operations or functions of the authentication system 142, including performing or facilitating some or all of the functionality of the method described below. The server 132 may be a standalone component or part of either another component or a larger system or network. Further, the central server 132 may comprise a single server element or a plurality of server elements. In the latter instance, the individual server elements may be electrically connected to each other to allow communication therebetween. The central server 132 may be implemented with a combination of hardware, software, firmware, and/or middleware, and, in an illustrated embodiment, may include one or more electronic processors or processing devices 134 and one or more electronic memory devices 136. In an embodiment, the memory device 136 may be a component of the processing device 134, while in another embodiment, it may be separate and distinct therefrom but accessible thereby.

The processing device 134 may comprise any type of suitable electronic processor or processing device (e.g., programmable microprocessor, microcontroller, center processing unit (CPU), application specific integrated circuit (ASIC), etc.) that is configured to receive and process data and/or execute appropriate programming instructions for software, firmware, programs, algorithms, scripts, etc., to perform various functions, for example and without limitation, those relating to the method described below. The processing device 134 may further include an input/output (I/O) or communication interface(s) 138 through which input and output signals may pass, for example, those communicated between the code readers 114 and the server 132 or between the server 132 and other components that may or may not be part of the authentication system 142. The communication interface(s) 138 may include, or be electrically connected to and configured for communication with, certain communication-supporting infrastructure (e.g., one or more known components/devices, for example, routers, modems, antennas, electrical ports, transceivers, etc.), and is/are configured to communicate with various components of the authentication system 142 via a public or private network or using other suitable communication techniques or protocols including, but not limited to, one or more of those described below.

The memory device 136 may include, for example, random access memory (RAM), read only memory (ROM), hard disk(s), universe serial bus (USB) drive(s), memory card(s), or any type of suitable electronic memory means and may store a variety of data. This includes, for example, software (e.g., code or logic), firmware, programs, algorithms, scripts, and other electronic instructions that, for example, are required to perform one or more of the functions described herein; and, in an embodiment, various data structures (e.g., databases, for example, database 140) for storing various information and data, including that required to perform some or all of the functions or method described herein.

As will be described in greater detail bellow, the server 132 may be configured and operable to receive data from one or more other components of the authentication system 142 (e.g., code reader(s) 114), and to store the received data in one or more databases 140 stored in a suitable electronic memory device, for example and without limitation, the memory device 136 of the central server 132. Additionally, in at least certain embodiments, the central server 132 may also be configured to process and compile data that it receives and/or that is stored in the database 140, to generate reports relating to the received/stored data, to generate and/or interface with user interfaces displayed on a display device associated with the server 132 and/or the code readers 114 to provide data to and/or receive data from a user of the authentication system 142.

The code readers 114 of the authentication system 142 may be used to read (e.g., scan and/or capture images of) machine-readable codes carried by containers, for example, the container 101 shown in FIG. 1 having one or more unique machine-readable code(s) 102, 104 associated therewith, and, in at least some embodiments, to obtain the data contained within or represented by the machine-readable code(s) 102, 104. With respect to FIG. 2, the code reader 114 can be configured to read the first code 102 and the second code 104 and transmit information to and/or from a central server 132 over a network 122 (e.g., to and/or from a database 140 in network 122).

Additionally, the code reader 114 may comprise or include any number of devices known in the art, for example and without limitation, laser scanners, image scanners, charge coupled device (CCD) scanners, and camera-based readers, to cite just a few possibilities. And the code reader(s) 114 may comprise handheld devices (e.g., handheld scanners, smart phones, tablets, or other personal digital electronic devices configured to capture an image or to scan or read a machine-readable code, etc.), non-handheld devices, or a combination of both handheld and non-handheld devices. It will be appreciated that the authentication system 142 and the associated environment may include a single code reader or a plurality of code readers, which can be located at different points throughout the distribution chain.

As shown in FIG. 2 with respect to code reader 114a, and as will be described more fully below, each of the code readers 114 may comprise any suitable apparatus that may include an electronic processor or processing device 116, an electronic memory device 118 that is part of or accessible by the processing device 116, a communications interface 120, a power supply, and/or other suitable hardware and software.

In implementations, the code reader 114 may include an application configured to obtain images of the first code 102 and/or the second code 104. Additionally, the application can be configured to be coded to facilitate the reading of codes from glass containers, aluminum containers, and the like. Moreover, the central server 132 may be configured to track the location of a specific container 101 and/or provide information and/or statistics (e.g., location, travel time, and so forth) to the code reader 114. With regard to the application, the application can be configured to assemble information, for example, the information and/or statistics, into a graphic format, for example, heat maps of activities, identification of stores of containers that are prevalent in counterfeiting, and isolating locations of interest. For example, the code readers 114 may include means for acquiring an image of the code(s) 102, 104 and/or for detecting and decoding the code 102, 104 being scanned. In one embodiment, the code reader 114 can include a smart phone having a camera and internet connectivity. In any event, the code readers 114 may comprise any known machine-readable code readers/image capturing devices known in the art, for example a camera, and may include a combination of hardware, software, and/or other components that enables the scanning or reading of machine-readable codes, among potentially other functionality.

In an embodiment, the code reader 114 can be configured to capture an image of the first code 102 and an image of the second code 104 using, for example, an image capturing device. The code reader is further configured to transmit the images of the first code 102 and the second code 104 to the central server 132 over the network 122 and to receive and/or analyze received information from the central server 132 over network 122. For example, the code reader 114 can obtain and transmit an image of the first code 102 and/or an image of the second code 104 from one location (e.g., a filling location, an end-use location, etc.) and transmit that or those images to the central server 132 over network 122 for verification that the first code 102 and the second code 104 have been linked/associated together in the database 140. In the case that the codes have been linked/associated, the central server 132 can determine that the container 101 and/or the product 112 is authentic. In the case that the codes are not linked/associated in the database 140, the central server 132 can determine that the product 112 is not authentic. Alternatively, another authentication technique may be utilized, for example, that described below where contrast ratios of the images of the codes can be determined and used for purposes of authenticating the container 101 and/or the product 112.

Similar to the processing device 134 of the central server 132, the processing device 116 of the code reader 114 may include any type of suitable electronic processing device (e.g., programmable microprocessor, microcontroller, central processing unit (CPU), application specific integrated circuit (ASIC), etc.) that is configured to process data and/or execute appropriate programming instructions for software, firmware, programs, applications, algorithms, scripts, etc., necessary to perform various functions of the code reader 114. The memory device 118 may include, for example, random access memory (RAM), read only memory (ROM), hard disk(s), universe serial bus (USB) drive(s), memory card(s), or any type of suitable electronic memory means and may store a variety of data. This includes, for example, software (e.g., code or logic), firmware, programs, applications, algorithms, scripts, etc., required to perform functions of the code reader 114.

In at least certain embodiments, the code readers 114 may also include one or more components to enable a user to manually provide or input certain data relating to the container(s) to which the machine-readable code(s) being scanned or read by the code reader 114 correspond. This data may include, for example, container location, container contents, container inspection data, date and/or time data, and other useful data. More particularly, the code reader 114 may include a user interface (not shown), for example and without limitation, a touch screen, keypad, keyboard, etc., that a user may utilize and/or manipulate to provide data relating to one or more containers. Each of the code readers 114 may further include one or more communication interfaces 120 that may include or be electrically connected to certain communication-supporting infrastructure (e.g., one or more known components/devices, for example, routers, modems, antennas, electromechanical ports, transceivers, etc.) to allow for the communication and exchange of data between the code reader 114 and one or more other components of the authentication system 142, for example, the central server 132.

In some embodiments, rather than the code reader 114 being configured to enable or allow a user to provide data relating to container(s) being scanned or read (e.g., via a user interface thereof), another component of the authentication system 142 may provide this functionality. For example, in an illustrative embodiment, one or more of the code readers 114 may be electrically connected to, for example, a computer 124 or other like device having one or more user interfaces (e.g., touch screen, keypad, keyboard, mouse, etc.) that a user may utilize to provide data to the central server 132. In addition to the user interface(s), the computer 124 or other like device may further include an electronic processor or processing device 126 and an electronic memory device 128 that is accessible by the processing device 126. The processing device 126 is similar to those described above in that it may include any type of suitable electronic processing device (e.g., programmable microprocessor, microcontroller, central processing unit (CPU), application specific integrated circuit (ASIC), etc.) that is configured to process data and/or execute appropriate programming instructions for software, firmware, programs, applications, algorithms, scripts, etc. necessary to perform various functions. Likewise, the memory device 128 is similar to those described above in that it may include any type of suitable electronic memory means and may store a variety of data. This includes, for example, software (e.g., code or logic), firmware, programs, applications, algorithms, scripts, etc., required to perform various functions. The computer 124 may further include one or more communication interfaces 130 that may include or be electrically connected to certain communication-supporting infrastructure (e.g., one or more known components/devices, for example, routers, modems, antennas, electromechanical ports, transceivers, etc.) to allow for the communication and exchange of data between the computer 124 and a code reader 114, as well as between the computer 124 and the central server 132. Accordingly, in an embodiment wherein one or more of the code readers 114 is connected to a computer 124, the communication interface 120 of the code reader 114 may be electrically connected to a communication interface 130 of the computer 124, and another communication interface 130 of the computer 124 may be electrically connected to the central server 132 via a suitable communication network, for example, a private or public network (e.g., the internet) or using other suitable communication techniques or protocols including, but not limited to, one or more of those described elsewhere herein. The computer 124 may receive data from the code reader 114 following the scanning, reading, or imaging of a code carried by a container, package the scanned data with the user-provided data via the computer 124, if applicable, and then communicate all of the data to the central server 132.

While certain code readers and arrangements relating thereto have been described above, it will be appreciated that the present disclosure is not limited to the use of any particular type of code reader(s) or corresponding arrangement(s). Additionally, the authentication system 142 may include and/or be configured to support any number of code readers 114. As will be appreciated in view of the description of the method set forth below, code readers 114 may be distributed at different points or locations throughout a distribution chain in which containers travel (e.g., container manufacturer, customer, point of sale, consumer/end user, return/collection center, etc.). Accordingly, the authentication system 142 may include one or a plurality of code readers, and thus, is not limited to any particular number of code readers 114.

As briefly described above, various components of the authentication system 142 may be configured to communicate with each other to exchange data therebetween. This communication may be facilitated across a suitable communications network through communication interfaces of the individual components. The communications network 122 may comprise a wired or wireless network, for example, one or a combination of: a suitable Ethernet network; radio and telecommunications/telephone networks (e.g., cellular networks, analog voice networks, or digital fiber communications networks); or any other suitable type of network and/or protocol (e.g., local area networks (LANs), wireless LANs (WLANs), broadband wireless access (BWA) networks, personal area networks (PANs), publicly switched telephone networks (PSTNs), etc.). The communications network 122 may be configured for use with one or more standard communications technologies and protocols, and may utilize links using known technologies, for example, Ethernet, IEEE 802.11, integrated services digital network (ISDN), digital subscriber line (DSL), as well as other known communications technologies. Similarly, the networking protocols used on a network to which some or all of the components of the authentication system 142 are interconnected may include multi-protocol label switching (MPL), the user datagram protocol (UDP), the hypertext transport protocol (HTTP), the simple mail transfer protocol (SMTP), and the file transfer protocol (FTP), among other suitable network protocols. In an embodiment, the transmission control protocol/Internet protocol (TCP/IP) may be used, in which case it will be appreciated that each component configured for communication using such a protocol can be configured with a static IP address or can be set up to automatically receive an assigned IP address from another device on the network. Further the data exchanged over such the network 122 may be represented using technologies, languages, and/or formats, for example, the hypertext markup language HTML), the extensile markup language (XML), and the simple object access protocol (SOAP) among other suitable data representation technologies. Accordingly, it will be appreciated in view of the foregoing that the communication between various components of the authentication system 142 may be facilitated in any number of ways using any number of techniques, and therefore, the present disclosure is not limited to any particular way or technique(s); rather any suitable way or technique may be utilized.

As briefly described above, the authentication system 142 includes the database 140, which is configured to store data relating to containers manufactured by a particular manufacturer. The data stored in the database 140 may comprise, for example, data manually entered or input by the manufacturer or by a user acting on the behalf of the manufacturer, including, for example, unique identifiers (e.g., serial numbers or code) corresponding to each container manufactured by the manufacturer, data relating to where and when the containers were manufactured, container quality (i.e., inspection) data, etc., as well as data received at the central server 132 as a result of the scanning or reading of the machine-readable code(s) of one or more containers by one or more code readers 114. Accordingly, and as shown in FIG. 2, the database 140 may be arranged or organized such that it contains a record for each container manufactured by the manufacturer, wherein the record contains data relating to that particular container. Each record may, in turn, be tied or associated to a particular customer to whom the corresponding container was supplied to allow all of the data relating to a particular customer to be easily located and compiled. As data is received by the central server 132 from, for example, a code reader 114 or as result of a scan/read by a code reader 114, the processing device 134 of the server 132 is configured to process the data to determine which container the received data corresponds to, and to then store the data in the record in the database 140 that is associated with that particular container. The type of data that may be stored in the database 140 is essentially unlimited and may include, for example and without limitation: manufacturer-related data (e.g., the date/time the container was manufactured, the production line used to manufacture the container, the date/time the container was supplied to a customer, the product, the container fill time and/or date, etc.) and/or end user-related data (e.g., one or more of a date/time a consumer/end user scanned the codes, a date/time the end user consumed or used the contents of the container, etc.), to cite only a few possibilities. The database 140 may be stored in or on a suitable electronic memory device, for example, the memory device 136 of the central server 132 or another suitable memory device of or accessible by the central server 132. Accordingly, the present disclosure is not intended to be limited to the database 140 being stored in or on any particular memory device.

Figure 3:
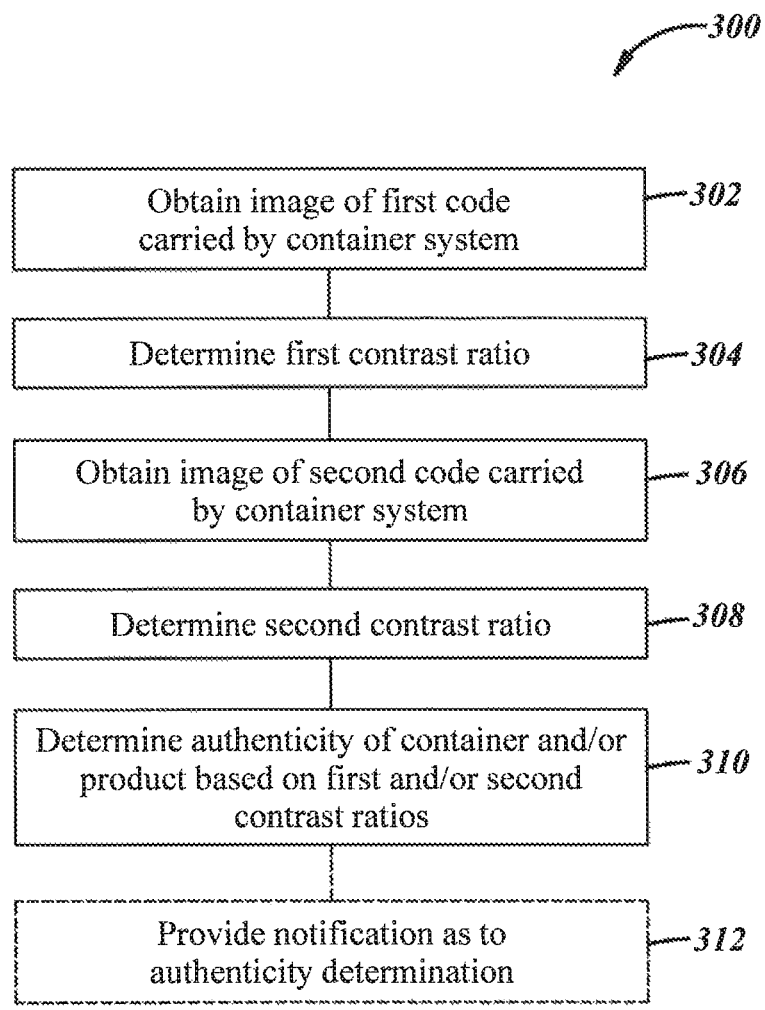
FIG. 3 is a flow diagram showing various steps of an illustrative embodiment of a method for authenticating one or both of a container and a product packaged therein using a first code and a second code.

FIG. 3 illustrates an example of a method 300 for use in authenticating a container and/or a product packaged therein. For purposes of illustration and clarity, method 300 will be described in the context of the container system 100 and the operating environment of the authentication system 142 described above and illustrated in FIGS. 1A through 2. It will be appreciated, however, that the application of the present methodology is not meant to be limited solely to such a container system and/or operating environment, but rather method 300 may find application with any number of container systems and operating environments. It will be further appreciated that while steps of the methodology may be described in a particular or and/or as being performed by particular components, unless otherwise noted, the present disclosure is not limited to any particular order of steps or to any particular components performing the steps.

As will be appreciated in view of the description below, method 300 may be used in the authentication of a container and/or a product packaged therein when the container system comprising the container includes a first or permanent code embedded in the container (e.g., laser-etched into a surface of the container) and a second code that is applied or affixed to, for example, the closure system of the container and is printed on a label (e.g., a label formed of paper or other suitable medium). More specifically, in an embodiment, method 300 comprises obtaining an image of each of the two codes and determining, for each image, a contrast ratio between one or more elements of the code and the background of the code. Because an image of a-code having dark elements printed on a light medium will have a substantially greater contrast than a permanent code embedded in a container, the contrast ratios of the images of the two codes may be used to determine whether one of the imaged codes is a permanent code. If it is determined that one of the imaged codes is, in fact, a permanent code, it can be determined that the container and/or product packaged therein is authentic, or the determination can at least be used as part of a larger authentication process. If, on the other hand, it is determined that one of the imaged codes is not a permanent code, it can be determined that a printed label has been applied to the container (e.g., over a permanent code) in an effort to, for example, circumvent authentication techniques, and thus, it can be determined that the container and/or product is counterfeit.

In an embodiment, method 300 comprises a step 302 of obtaining an image of the first code 102 carried by the container system 100, and the container 101 thereof, in particular. In implementations, obtaining the image of the first code 102 may include using the code reader 114 to collect or capture an image of the code 102. For example, the code reader 114 may include an image capturing device, for example a camera, that is configured to capture images of codes carried by containers. In some embodiments, the code reader 114 may be configured to give the user guidance to better enable collection of the image of the code (e.g., instruction as to when and how to use a camera to take a picture). Additionally, in an embodiment, obtaining an image of the first code 102 may include communicating the captured image of the first code 102 to the central server 132 over network 122 when the central server 132 is used to process the captured image. The code reader 114 may also be used to receive information to be added to the database 140, the information associated with the container 101 and/or the product in the container 101 when obtaining an image of the first code 102. For example, the additional information may be entered into the code reader 114 by a user and/or may be obtained from a code other than the first code 102. Examples of the additional information may include lot information, date of container filling, provenance, intended destination, and the like. The additional information may be added to the database along with the information determined from the first code 102.

Method 300 includes a step 304 of determining a contrast ratio (also referred to herein as a "first" contrast ratio) between one or more elements of the first code 102 and the background of the first code 102. Determining the contrast ratio of the first code 102 can include determining a contrast ratio at different times, for example, before filling the container 101 resulting in a first contrast ratio, and after filling the container 101 resulting in a second contrast ratio due to the color of the product within the container 101. The first contrast ratio and the second contrast ratio determined in this step can each be associated with the first code 102. It will be appreciated that additional contrast ratios may be determined and associated with the first code 102. In determining the first contrast ratio, the processor 116 of the code reader 114 may process the image and, using techniques well known in the art, calculate the photographic contrast between the one or more elements and the background of the first code 102 resulting in a contrast ratio corresponding to the first code 102. The code reader 114 can also process the image of the first code 102 to determine, for example, a serial number associated with the first code 102 or other quality metrics in addition to the first contrast ratio. Alternatively, and depending on the implementation, the contrast ratio may be determined by the processing device 134 of the central server 132 or the processor 126 of the computer 124. In some instances, obtaining an image of the first code 102 and/or determining the first contrast ratio may include decoding an encoded image of the first code 102, which may include converting the encoded first code image to the original first code image. Decoding the encoded image of the first code 102 may be performed by the processor 116 of the code reader 114, the processor 126 of the computer 124, and/or the processing device 134 of the central server 132.

Method 300 further comprises a step 306 of obtaining an image of the second code 104 carried by the container system 100, and, in an embodiment, the container closure system 108 thereof, in particular. In implementations, obtaining the image of the second code 104 may include using the code reader 114 and/or the image capturing device (e.g., a camera) thereof, in particular, to collect or capture the image of the second code 104. As with step 302, in some embodiments, the code reader 114 may be configured to give the user guidance to better enable collection of the image of the code (e.g., instruction as to when and how to use a camera to take a picture). Additionally, in an embodiment, obtaining an image of the second code 104 may include communicating the captured image of the second code 104 to a central server 132 over network 122 when the central server 132 is used to process the captured image. The code reader 114 may also be used to receive information to be added to the database 140, the information associated with the container 101 and/or the product in the container 101 when obtaining an image of the second code 104. For example, the additional information may be entered into the code reader 114 by a user and/or may be obtained from a code or indicator other than the second code 102. Examples of the additional information may include lot information, date of container filling, provenance, intended destination, and the like. The additional information may be added to the database 140 along with the information determined from the second code 104.

Method 300 further comprises a step 308 of determining a contrast ratio between one or more elements of the second code 104 and the background of the second code 104. In determining the contrast ratio of the second code 104, the processor 116 of the code reader 114 may process the image of the second code 104 and, using techniques well known in the art, calculate the photographic contrast between the one or more elements and the background of the second code 104 resulting in a contrast ratio corresponding to the second code 104. The code reader 114 can also process the image of the second code 104 to determine, for example, a serial number associated with the second code 104 or other quality metrics in addition to the second contrast ratio. Alternatively, and depending on the implementation, the contrast ratio may be determined by the processing device 134 of the central server 132 or the processor 126 of the computer 124. In some instances, obtaining an image of the second code 104 and/or determining the second contrast ratio may include decoding an encoded image of the second code 104, which may include converting the encoded second code image data to original second code image data. Decoding the encoded image of the second code 104 may be performed by the processor 116 of the code reader 114, the processor 126 of the computer 124, and/or the processing device 134 of the central server 132.

Once images of the first and second codes 102, 104 are obtained and contrast ratios for each are determined, method 300 may move to a step 310 of determining the authenticity of one or both of the container 101 and/or the product 112 packaged therein based at least in part on the contrast ratios corresponding to the first and second codes 102, 104. In an embodiment, step 310 comprises using the first and second contrast ratios to determine or verify that at least one of the two codes for which images were obtained is a permanent code embedded in a surface of the container. Step 310 may be performed by the code reader 114 and associated processor 116, by the computer 124 and associated processor 126 and/or by the central server 132 and associated processing device 134. This determination and/or verification step may be carried out in a number of ways.

In one implementation, each contrast ratio is compared to a threshold, and if at least one contrast ratio meets or falls below the threshold, the code corresponding thereto is determined to be a permanent code. For example, a code reader 114 can obtain an image of each of the first code 102 and the second code 104, and the resulting contrast ratios for the codes can each be compared to a predetermined threshold corresponding to each contrast ratio. If the contrast ratio corresponding to the first code 102 or the contrast ratio corresponding to the second code 104 meets or falls below the threshold, the code associated with the contrast ratio that meets or falls below the threshold is determined to be a permanent and authentic code. If neither contrast ratio meets or falls below the threshold, then it can be determined that neither the first code 102 nor the second code 104 is permanent and the container 101 and/or the product 112 packaged therein is/are determined not to be authentic.

In yet another implementation, a difference between the first contrast ratio and the second contrast ratio is determined and used to determine whether one of the two codes is a permanent code. More specifically, in an embodiment, the difference may be compared to a predetermined, empirically derived threshold and if the difference exceeds (or, in an embodiment, meets or exceeds) the threshold, it can be determined that one of the codes is a permanent code. On the other hand, if the difference falls below (or, in an embodiment, meets or falls below) the threshold, it can be determined that one of the codes is not a permanent code. In a specific example, a code reader 114 can obtain an image of the first code 102 and the second code 104. Depending on the implementation, the code reader 114, the computer 124, or the central server 132 can then determine a contrast ratio for each obtained image, and a difference between the two contrast ratios. The difference can then be compared with the predetermined, empirically-derived threshold. In some instances, the predetermined, empirically-derived threshold may be determined from and/or may include a difference between two contrast ratios determined from an initial reading of the first code 102 and the second code 104 (e.g., proximate in time to a container filling or sealing step). If the difference exceeds (or, in an embodiment, meets or exceeds) the predetermined, empirically-derived threshold, it can be determined that one of the codes is a permanent code and thus, in an embodiment, that the container 101 and/or product 112 is/are authentic. Otherwise, it can be determined that neither of the codes is permanent, and thus, that the container 101 and/or product 112 is not authentic.

One benefit of using the difference in contrast ratios rather than the contrast ratios themselves to determine or verify that one of the two codes for which images were obtained is a permanent code embedded in a surface of the container is that while contrast ratios in general will be different based on the lighting conditions when an image of a code is obtained, the difference will be maintained between the two codes regardless of the lighting conditions.

In yet another implementation, a difference between the first contrast ratio and the second contrast ratio may be determined and then used in conjunction with contrast ratio differences stored in an electronic memory device to determine whether one of the codes is a permanent code. More specifically, following the filling and sealing of a container, images of the first and second codes may be obtained and a contrast ratio for each image may be determined. A difference between those contrast ratios may then be determined and stored in a database on an electronic memory device.

Later, when method 300 is being performed, a code reader 114 can obtain an image of the first code 102 and the second code 104. Depending on the implementation, the code reader 114, the computer 124, or the central server 132 may then determine a contrast ratio for each obtained image and a difference between the two obtained images, and a difference between the two contrast ratios. The difference may then be looked up in a database to determine if the difference matches a predetermined difference stored in the database (i.e., the difference in contrast ratios described above that was determined and then stored in a database on an electronic memory device). If it is determined that there is a match, then it can be determined that one of the codes is a permanent code, and thus, in some embodiments, that the container 101 and/or product 112 is authentic. If, however, it is determined that there is not a match, then it can be determined that neither of the codes is a permanent code, and thus, that the container 101 and/or product 112 is not authentic.

Regardless of the form that step 310 takes, in some instances, method 300 may include a step 312 of providing a notification as to whether the container 101 and/or the product 112 is authentic based on the determination made in step 310. More specifically, if it is determined in step 310 that neither of the imaged codes is a permanent code, then an indication may be provided to a user through, for example, the code reader 114 (e.g., a text and/or graphical message on a display of the code reader 114) that the container 101 and/or the product 112 is not authentic. Depending on the operating environment, an electronic notification signal representative of a notification may be generated by the processor 116 of the code reader 114 to cause the notification to be displayed on the display, or the notification signal may be generated at the server 132 or computer 124 and communicated to the code reader 114. Additionally, or alternatively, a notification may be provided to a third party (e.g., a manufacturer or law enforcement) indicating that a counterfeit container/product has been found and, in some instances, identifying the location of the container/product. Depending on the implementation, this third-party notification may be provided by the code reader 114, the server 132, or another suitable component.

If, on the other hand, it is determined in step 310 that one of the two imaged codes is, in fact, a permanent code, step 312 may comprise providing an indication that the container 101 and/or product 112 is/are authentic. Alternatively, rather than providing a notification in step 312, method 300 may proceed to a further authentication step of determining whether there is a link between the two imaged codes. In the embodiment where method 300 includes determining whether there is a link between the two imaged codes, determining whether there is a link between the two imaged codes may include reading the two imaged codes determining whether they are linked together in a database stored in or on an electronic memory device of, for example, the central server 132 or computer 124. If it is determined that the codes are linked, then an indication may be provided to the user that the container 101 and/or product 112 is/are authentic. If, however, it is determined that the two codes are not linked, then an indication may be provided to the user that the container 101 and/or product 112 are not authentic.

It is contemplated that method 300 may be performed at any point in the supply chain in which a container system 100 travels to determine whether the container 101 and/or the product 112 packaged therein is authentic.

There thus has been disclosed a system for authenticating a product in a container that fully satisfy one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method for use in authenticating one or both of a container and a product packaged therein, comprising:
   obtaining an image of a first code carried by a container system comprising the container, wherein the first code has one or more elements and is representative of first information relating to one of the container and the product packaged in the container;
   determining at least one first contrast ratio between the one or more elements of the first code and a background of the first code;
   obtaining an image of a second code carried by the container system, wherein the second code has one or more elements and is representative of second information relating to the other of the container and the product packaged in the container,
   determining at least one second contrast ratio between the one or more elements of the second code and a background of the second code;
   determining a difference between the at least one first and second contrast ratios; and
   determining authenticity of one or both of the container and the product packaged therein based at least in part on the difference between the at least one first and second contrast ratios.

2. The method of claim 1, wherein determining the at least one first contrast ratio includes obtaining and determining contrast ratios before and after the container is filled with the product, and associating the contrast ratios with the first code.

3. The method of claim 1, wherein determining the authenticity of one or both of the container and the product packaged therein comprises determining whether one of the first or second codes is embedded in a surface of the container based on the difference between the at least one first and second contrast ratios and determining that one or both of the container and the product are authentic when it is determined that one of the first and second codes is embedded in the surface of the container.

4. The method of claim 3, wherein determining whether one of the first and second codes is embedded in a surface of the container comprises comparing the difference between the at least one first and second contrast ratios to a predetermined threshold and determining that one of the first and second codes is embedded based on the comparison of the difference between the at least one first and second contrast ratios to the predetermined threshold.

5. The method of claim 1, wherein determining the authenticity of one or both of the container and the product packaged therein comprises determining whether one of the first or second codes is embedded in a surface of the container based on the difference between the at least one first and second contrast ratios, and when it is determined that one of the first or second codes is embedded in the container surface, the method further comprises:

reading the first and second codes and determining whether there is a link therebetween; and when there is a link between the first and second codes, determining that one or both of the container and the product package therein are authentic.

6. The method of claim 1, further comprising providing a notification as to the authenticity determination.

7. A method for use in authenticating one or both of a container and a product packaged therein, comprising:

obtaining an image of a first code carried by a container system comprising the container, wherein the first code has one or more elements and is representative of first information relating to one of the container and the product packaged in the container;

determining at least one first contrast ratio between the one or more elements of the first code and a background of the first code;

obtaining an image of a second code carried by the container system, wherein the second code has one or more elements and is representative of second information relating to the other of the container and the product packaged in the container, determining at least one second contrast ratio between the one or more elements of the second code and a background of the second code;

determining authenticity of one or both of the container and the product based at least in part on at least one of the at least one first and second contrast ratios.

8. The method of claim 7, wherein determining the authenticity of one or both of the container and the product comprises determining whether one of the first and second codes is embedded in the surface of the container based on the at least one first and second contrast ratios and determining that one or both of the container and product are authentic when it is determined that one of the first and second codes is embedded in the surface of the container.

9. The method of claim 8, wherein determining whether one of the first and second codes is embedded in the surface of the container comprises:

comparing at least one of the at least one first and second contrast ratios to a predetermined threshold; and determining that one of the first and second codes is embedded in the surface of the container when one of the at least one of the at least one first and second ratios meets or exceeds the predetermined threshold.

10. The method of claim 7, wherein determining the authenticity of one or both of the container and the product comprises determining whether one of the first and second codes is embedded in a surface of the container based on the at least one first and second contrast ratios, and when it is determined that one of the first or second codes is embedded in the container surface, the method further comprises:

reading the first and second codes and determining whether there is a link therebetween; and when there is a link between the first and second codes, determining that one or both of the container and the product package therein are authentic.

11. The method of claim 7, further comprising providing a notification as to the authenticity determination.

12. An authentication system, comprising:
a code reader,
a central server;
a database accessible by the server and providing storage for data relating to one or both of a container and a product packaged in the container traveling within a distribution chain; and at least one electronic code reader configured to capture images of codes carried by a container system that includes the container and to electronically communicate the captured images to the central server;

wherein the code reader is configured to;

obtain an image captured by the at least one code reader of a first code carried by the container system, wherein the first code has one or more elements and is representative of first information relating to one of the container and the product packaged in the container;

determine at least one first contrast ratio between the one or more elements of the first code and a background of the first code;

obtain an image captured by the at least one code reader of a second code carried by the container system, wherein the second code has one or more elements and is representative of second information relating to the other of the container and the product packaged in the container; and determine at least one second contrast ratio between the one or more elements of the second code and a background of the second code;

wherein the central server will then determine authenticity of one or both of the container and the product based at least in part on the at least one first and second contrast ratios.

13. The authentication system of claim 12, wherein the central server is configured to determine the authenticity of one or both of the container and the product by determining whether one of the first and second codes is embedded in the surface of the container based on the at least one first and second contrast ratios and determining that one or both of the container and product are authentic when it is determined that one of the first and second codes is embedded in the surface of the container.

14. The authentication system of claim 13, wherein the central server is configured to determine whether one of the first and second codes is embedded in the surface of the container by:

comparing at least one of the at least one first and second contrast ratios to a predetermined threshold; and determining that one of the first and second codes is embedded in the surface of the container when one of the at least one of the at least one first and second ratios meets or exceeds the predetermined threshold.

15. The authentication system of claim 13, wherein the central server is further configured to determine a difference between the at least one first and second contrast ratios, and to determine whether one of the first and second codes is embedded in the surface of the container based on the difference between the at least one first and second contrast ratios.

16. The authentication system of claim 15, wherein the central server is configured to determine whether one of the first and second codes is embedded in a surface of the container by comparing the difference between the at least one first and second contrast ratios to a predetermined threshold and determining that one of the first and second codes is embedded based on the comparison of the difference between the at least one first and second contrast ratios to the predetermined threshold.

17. The authentication system of claim 12, wherein the central server is further configured to determine a difference between the at least one first and second contrast ratios, and to determine the authenticity of the one or both of the container and product based on the determined difference.

18. The authentication system of claim 17, wherein the central server is configured to determine the authenticity of one or both of the container and the product by comparing the difference between the at least one first and second contrast ratios to a predetermined threshold and determining that one of the first and second codes is embedded based on the comparison of the difference between the at least one first and second contrast ratios to the predetermined threshold.

19. The authentication system of claim 12, wherein the central server is configured to determine the authenticity of one or both of the container and the product by determining whether one of the first and second codes is embedded in the surface of the container based on the at least one first and second contrast ratios, and when it is determined that one of the first or second codes is embedded in the container surface, the central server is further configured to:
   read the first and second codes and determining whether there is a link therebetween; and
   when there is a link between the first and second codes, determine that one or both of the container and the product package therein are authentic.

20. The authentication system of claim 12, where the central server is further configured to generate an electronic signal representative of a notification as to the authenticity determination.

* * * * *